(12) United States Patent
Abbasfar

(10) Patent No.: US 8,279,094 B2
(45) Date of Patent: Oct. 2, 2012

(54) ENCODING AND DECODING TECHNIQUES WITH IMPROVED TIMING MARGIN

(75) Inventor: Aliazam Abbasfar, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 271 days.

(21) Appl. No.: 12/679,975

(22) PCT Filed: Aug. 29, 2008

(86) PCT No.: PCT/US2008/074752
§ 371 (c)(1),
(2), (4) Date: Jul. 1, 2010

(87) PCT Pub. No.: WO2009/055146
PCT Pub. Date: Apr. 30, 2009

(65) Prior Publication Data
US 2010/0290481 A1 Nov. 18, 2010

Related U.S. Application Data

(60) Provisional application No. 60/982,267, filed on Oct. 24, 2007.

(51) Int. Cl.
*H03M 5/00* (2006.01)
(52) U.S. Cl. ............................... 341/58; 341/59; 341/50
(58) Field of Classification Search ................ 341/58, 341/59, 50
See application file for complete search history.

(56) References Cited

U.S. PATENT DOCUMENTS

| | | | | |
|---|---|---|---|---|
| 4,864,303 A | * | 9/1989 | Ofek | 341/95 |
| 5,220,568 A | * | 6/1993 | Howe et al. | 714/782 |
| 5,396,239 A | * | 3/1995 | McMahon et al. | 341/58 |
| 6,999,516 B1 | | 2/2006 | Rajan | |
| 7,855,665 B1 | * | 12/2010 | Chaichanavong et al. | 341/59 |
| 7,928,866 B2 | * | 4/2011 | Boles et al. | 341/58 |
| 2003/0095606 A1 | | 5/2003 | Horowitz et al. | 375/286 |
| 2004/0052375 A1 | | 3/2004 | Craft et al. | 380/256 |
| 2006/0132335 A1 | | 6/2006 | Kojima | 341/58 |

FOREIGN PATENT DOCUMENTS

WO 9832266 A1 7/1998

OTHER PUBLICATIONS

Carusone et al., "Differential Signaling with a Reduced Number of Signal Paths", IEEE Transactions on Circuits and Systems—II: Analog and Digital Signal Processing, Mar. 2001, pp. 294-300, vol. 48, No. 3.

(Continued)

*Primary Examiner* — Patricia Nguyen
(74) *Attorney, Agent, or Firm* — Mahamedi Paradice Kreisman LLP; Lance M. Kreisman

(57) ABSTRACT

Embodiments of an encoder and a decoder are described. The encoder encodes data into a series of parallel codewords. Each codeword is expressed two sets of logic values (e.g., a set of logic 0s and a set of logic 1s) on two corresponding sets of output nodes, a first set and a second set. The encoder selects a current codeword such that it differs from the immediately preceding codeword by a fixed number of zero-to-one transitions on the first set of nodes and a fixed number of one-to-zero transitions on the second set of nodes. A decoder receives and decodes the codewords by comparing symbols on node pairs for which the symbols expressed in the prior code word were alike and decoding the results of those comparisons.

21 Claims, 7 Drawing Sheets

OTHER PUBLICATIONS

EP Office Action with mail date of Jun. 14, 2010 re EP Application No. 08841332.3 re comments of the written opinion and amendment. 2 Pages.

EP Preliminary Amendment dated Apr. 12, 2010 re EP Application No. 08841332.3. 12 pages.

Poulton, J.W., et al., "Multiwire Differential Signaling," Technical Paper, University of North Carolina-Chapel Hill, Department of Computer Science, Aug. 2003. 20 pages.

Sim, Jae-Yoon, "Multilevel Differential Encoding with Precentering for High-Speed Parallel Link Transceiver", IEEE Journal of Solid-State Circuits, vol. 40, No. 8, Aug. 2005. 7 pages.

Zogopoulos, Sotirios et al. "High-Speed Single-Ended Parallel Link Based on Three-Level Differential Encoding", IEEE Journal of Solid-State Circuits, vol. 44, No. 2, Feb. 2009. 9 pages.

Zogopoulos, et al., "A Low Power 4.2 Gb/s/pin Parallel Link Using Three-Level Differential Encoding," 2006 IEEE Symposium of VLSI Circuits Digest of Technical Papers. 2 pages.

* cited by examiner

| DATA VALUE | T0 | T1 | T2 | T3 | T4 | T5 | T6 | T7 | T8 | T9 | T10 |
|---|---|---|---|---|---|---|---|---|---|---|---|
| DQ[1] | 0 | 0 | 0 | 1 | 1 | 1 | 1 | 0 | 0 | 0 | 1 |
| DQ[0] | 0 | 0 | 1 | 0 | 0 | 1 | 0 | 0 | 0 | 1 | 0 |
| a | 0 | 1 | 1 | 0 | 0 | 1 | 1 | 0 | 0 | 1 | 0 |
| b | 0 | 1 | 1 | 1 | 1 | 0 | 1 | 0 | 1 | 1 | 1 |
| c | 1 | 1 | 0 | 0 | 0 | 1 | 0 | 1 | 1 | 0 | 0 |
| d | 1 | 0 | 0 | 1 | 0 | 0 | 0 | 1 | 1 | 0 | 1 |
| CW# | 0 | 2 | 1 | 4 | 2 | 5 | 2 | 0 | 2 | 1 | 4 |
| Grp# | 0 | 1 | 0 | 2 | 1 | 2 | 1 | 0 | 1 | 0 | 2 |
| SAyy | SAab / SAcd | SAad / SAbc | SAab / SAcd | SAac / SAbd | SAad / SAbc | SAac / SAbd | SAad / SAbc | SAab / SAcd | SAad / SAbc | SAab / SAcd | SAac / SAbd |

FIG. 2

| DATA VALUE | 0 | 0 | 7 | 2 | 1 | 3 | 5 | 6 | 6 | 7 | 0 |
|---|---|---|---|---|---|---|---|---|---|---|---|
| DQ[2] | 0 | 0 | 1 | 0 | 0 | 0 | 1 | 1 | 1 | 1 | 0 |
| DQ[1] | 0 | 0 | 1 | 1 | 0 | 1 | 0 | 1 | 1 | 1 | 0 |
| DQ[0] | 0 | 0 | 1 | 0 | 1 | 1 | 1 | 0 | 1 | 1 | 0 |
| a | 0 | 1 | 1 | 1 | 1 | 0 | 0 | 0 | 0 | 0 | 1 |
| b | 0 | 0 | 1 | 1 | 0 | 0 | 1 | 0 | 0 | 0 | 0 |
| c | 0 | 0 | 1 | 0 | 1 | 1 | 1 | 0 | 1 | 1 | 0 |
| d | 1 | 0 | 1 | 1 | 0 | 1 | 1 | 1 | 0 | 1 | 1 |
| e | 1 | 1 | 0 | 0 | 0 | 1 | 0 | 1 | 1 | 0 | 0 |
| f | 1 | 1 | 1 | 1 | 1 | 1 | 0 | 1 | 1 | 1 | 1 |
| CW# | 0 | 2 | 4 | 15 | 13 | 3 | 16 | 0 | 14 | 16 | 4 |
| Grp# | 0 | 1 | 2 | 7 | 6 | 2 | 8 | 0 | 7 | 8 | 2 |
| | T0 | T1 | T2 | T3 | T4 | T5 | T6 | T7 | T8 | T9 | T10 |

FIG. 7

ENCODING AND DECODING TECHNIQUES WITH IMPROVED TIMING MARGIN

TECHNICAL FIELD

Digital communication systems convey data over one or more conductors as varying voltages or currents that represent the data as series of symbols. Over a single wire, for example, relatively low and high voltages can be used to represent a logic '0' and a logic '1,' respectively. The bandwidth of a given communication channel is generally limited by the speed at which the channel can transition between different types of symbols (e.g., between relatively high and low voltages). The time required to transition between symbols varies with symbol patterns, making it difficult to identify symbol boundaries at high data rates.

Communication systems are designed to accommodate some amount of variation in transition timing. The tolerance of a communication system to such variations is called the 'timing margin.' In general, increased timing margins provide greater noise tolerance and, as a consequence, higher speed performance. Therefore, there is a demand for techniques that increase timing margins.

BRIEF DESCRIPTION OF THE FIGURES

FIG. 2 is a waveform diagram illustrating how an embodiment of encoder of FIG. 1 implements the coding technique of Table 1 to encode a sequence of two-symbol data patterns DQ[1:0] into a series of parallel symbol sets S[3:0] to be conveyed on links a through d.

FIG. 7 is a waveform diagram illustrating a sequence of three-symbol data patterns DQ[2:0] and the corresponding six-symbol codewords S[5:0] for an embodiment that employs the codespace of Table 2 to encode three-bit data.

DETAILED DESCRIPTION

Figure 1:
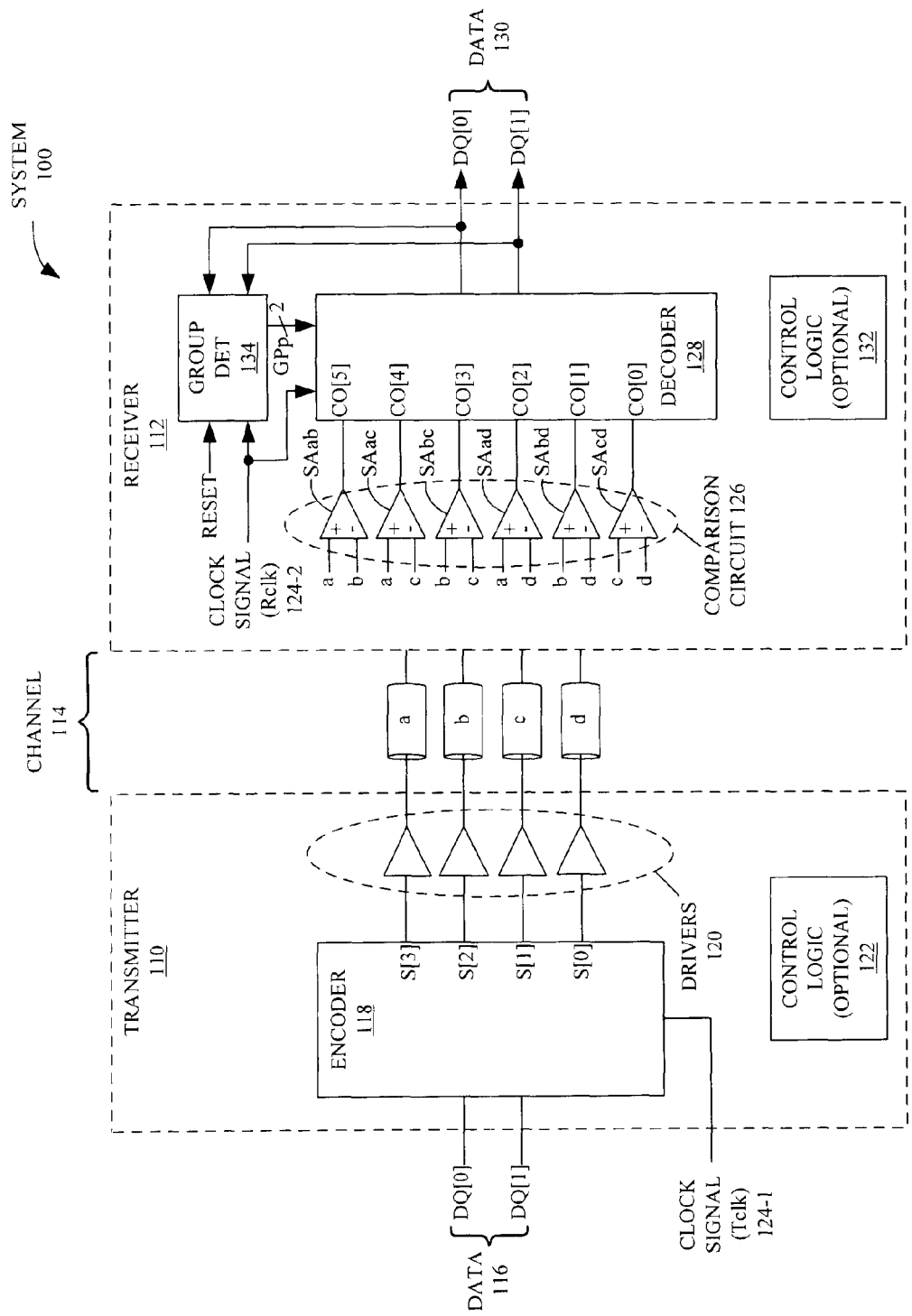
FIG. 1 presents a block diagram illustrating a system that encodes and decodes two-bit data DQ[1:0] in accordance with one embodiment.

FIG. 1 presents a block diagram illustrating a system 100 that includes a transmitter 110 and a receiver 112 connected by a communication channel 114. An encoder 118 encodes two-bit data DQ[1:0] 116 into a series of parallel codewords S[3:0] for transmission over corresponding links a, b, c, and d of the channel. Each codeword S[3:0] is expressed as two sets of like symbols, one representing logic 0s on a first pair of links (e.g., S[3:2]=00 on links a and b of channel 114) and another representing logic 1s on the remaining pair of links (e.g., S[1:0]=11 on links c and d). Encoder 118 selects a current codeword such that it differs from the immediately preceding codeword by a fixed number of zero-to-one transitions on the first pair of links and a fixed number of one-to-zero transitions on the remaining pair of links. In the example in which the prior codeword S[3:0] is 0011, the two bit data DQ[1:0] 116 can be encoded into the subsequent codeword as one of the following four possibilities: 0101, 0110, 1001, or 1010.

A comparison circuit 126 in receiver 112 compares the symbols on each pair of links a, b, c and d using a set of six sense amplifiers SA, the outputs of which are conveyed to a decoder 128. The decoder decodes the outputs from comparison circuit 126 by considering only those sense amplifiers that received two like-symbols in the prior time interval. For reasons detailed below, limiting consideration to that subset of sense amplifiers considerably increases the timing margin for received data, and consequently supports improved speed performance.

Encoder 118 receives two-bit data DQ[1:0] on edges of an internal or external transmit clock signal TClk 124-1. The resulting codewords S[3:0] are provided as analog or digital signals by drivers 120 onto links a through d. In a typical example, transmitter 110 and receiver 112 are on respective integrated circuits (ICs), such as a memory controller IC and a memory device IC. The following discussion refers to elements a through d alternatively as 'links' or 'nodes.' The former refers to the entire AC- or DC-coupled signal path between encoder 118 and comparison circuit 126, whereas the latter refers to an input or output pin, wire, or terminal.

Comparison circuit 126 includes six sense amplifiers SA in this example. The label for each sense amplifier includes two lowercase characters to that correspond to the compared input nodes. For example, sense amplifier SAab compares input nodes a and b from like-named links of channel 114. Decoder 128 samples the outputs from comparison circuit 126 on edges of a receive clock signal RClk 124-2 and decodes the resultant sample sets to recover data 130. A group detector 134 identifies the codeword group for each codeword from data 130. Decoder 128 uses the identified group GPp from the prior codeword to resolve the next codeword. A reset signal RESET is asserted to place group detector 134 in a known state.

Control logic 122 and 132 are optionally included on respective transmitter 110 and receiver 112 to initialize encoding and decoding processes. For example, the initialization may involve a handshake procedure in which the receiver 112 confirms that the state of the channel 114 is known prior to normal operation. Additionally, during the initialization mode of operation, optional control logic 132 may reset group detector 134 using reset signal RESET prior to the transmission of a predetermined sequence of symbols sets by transmitter 110. The optional control logic 122 and 132 can communicate via a separated command interface (not shown).

The codewords of this embodiment are divided into three groups of two. In particular, if the current codeword is from group n, the next codeword is not from group n, e.g., the next two input data bits are encoded as one of the remaining four codewords S[3:0] in Table 1.

TABLE 1

| Group (Grp#) | Codeword Number (CW#) | Codeword S[3:0] for links a b c d | Next Codeword [CW] Corresponding to Data DQ[1:0] of: 00, 01, 10, 11 | Comparison Circuit 126 Outputs | | | | | |
|---|---|---|---|---|---|---|---|---|---|
| | | | | a-b | c-d | a-d | b-c | b-d | a-c |
| 0 | 0 | 0 0 1 1 | 2, 3, 4, 5 | x | x | 0 | 0 | 0 | 0 |
| | 1 | 1 1 0 0 | 2, 3, 4, 5 | x | x | 1 | 1 | 1 | 1 |
| 1 | 2 | 0 1 1 0 | 0, 1, 4, 5 | 0 | 1 | x | x | 1 | 0 |
| | 3 | 1 0 0 1 | 0, 1, 4, 5 | 1 | 0 | x | x | 0 | 1 |
| 2 | 4 | 0 1 0 1 | 0, 1, 2, 3 | 0 | 0 | 0 | 1 | x | x |
| | 5 | 1 0 1 0 | 0, 1, 2, 3 | 1 | 1 | 1 | 0 | x | x |

As shown in Table 1, each of sense amplifiers SA in comparison circuit 126 can have one of three output values. Using the rightmost column, for example, sense amplifier SAac, which receives inputs a and c, outputs:

1. a voltage representative of a logic 0 (e.g., a negative voltage −Vp) when symbols S[3] and S[1] on respective nodes a and c express logic values of 0 and 1, respectively;
2. a voltage representative of a logic 1 (e.g., a positive voltage +Vp) when nodes a and c express logic values of 1 and 0, respectively; and
3. an intermediate voltage (e.g., a voltage Vint) represented by an 'x', when nodes a and c express like logic values (i.e., are both 1 or both 0).

Each codeword of Table 1 causes one pair of sense amplifiers to output the intermediate voltage Vint and the remaining four to output a positive or negative voltage ±Vp. Encoder 118 selects each current codeword such that the two intermediate voltages Vint sensed in the preceding codeword transition to one of voltages ±Vp in the current codeword for the one pair. Decoder 128 decodes the outputs from the two sense amplifiers that transitioned between voltage Vint and ±Vp to recover the encoded two-bit data DQ[1:0] 130. Transitions from the intermediate voltage Vin to ±Vp take less time than the more extreme transitions between positive and negative voltages −Vp and +Vp in differential signaling systems. The faster transitions provided by the coding technique of Table 1 increase the timing margin of system 100 over similar differential systems, and thus afford increased data rates, reduced noise sensitivity, or both.

FIG. 2 presents a waveform diagram 200 illustrating how an embodiment of encoder 118 (FIG. 1) implements the coding technique of Table 1 to encode a sequence of two-symbol data patterns DQ[1:0] 116 (FIG. 1) into a series of parallel symbol sets S[3:0]. As noted previously, the bit positions of symbols S[3:0] correspond to respective links a, b, c, and d (e.g., S[3] is the logic value expressed on link a). The encoding technique encodes each successive codeword based upon the temporally adjacent and immediately preceding codeword. In the series of time intervals T0-T10 of FIG. 2, each codeword in a current time interval is used to encode subsequent data DQ[1:0] into a subsequent codeword S[3:0] in the next time interval.

Beginning at time T0, the first data is expressed using a codeword from a predetermined group, in this case codeword zero of group zero (Grp#=0), which is expressed as symbols S[3:0]=0011. The use of a predetermined group allows decoder 128 (FIG. 1) to begin decoding in a known state, which is important for reasons noted below. Per Table 1, encoder 118 (FIG. 1) divides the symbols of the current time interval T0 into two sets of symbols, a first symbol set 205 representing logic 0s on a first set of nodes (coupled to links a and b) and a second symbol set 210 representing logic 1s on a second set of nodes (coupled to links c and d). Encoder 118 (FIG. 1) encodes the subsequent codeword at time interval T1 such that one symbol on the first set of nodes (links a and b) transitions from 0 to 1 and one symbol on the second set of nodes (links c and d) transitions from a 1 to a 0.

The encoding technique does not use the same code group Grp# for successive codewords. Therefore, the codeword for interval T1 is selected from groups 1 or 2. Per Table 1, the four possible values of data DQ[1:0] 116 (FIG. 1) can be expressed using the four codewords of groups 1 and 2. In this example, data DQ[1:0] is 00 in interval T1, which translates into codeword two, or 0110. More generally, an incoming data pattern is encoded into a current codeword such that the current codeword is expressed as a third symbol set 215 on the first set of links {a, b} and a fourth symbol set 220 on the second set of links {c, d} defined by the codeword from time interval T0.

The encoding selects the third set of symbols from a first group of symbol sets in which each set has a fixed, positive number of logic 0 symbols and the fourth set of symbols from a second group of symbols in which each symbol has a fixed, positive number of logic 1 symbols. In this embodiment, both fixed, positive numbers are 1, but the encoding technique can be extended to different codespaces.

In creating the subsequent codeword at time interval T2 (i.e., the current time interval is T1), the first set of nodes (or links) becomes nodes 225 associated with links a and d (both at logic 0) and the second set of nodes becomes nodes 230 associated with links b and c (both at logic 1). The subsequent codeword at time interval T3 is encoded such that one symbol in each of first and second symbol sets 225 and 230 does not transition. Each subsequent codeword is similarly encoded in a manner that ensures that the collection of nodes exhibiting 0s and the collection of nodes exhibiting 1s in the prior time interval each include a mixed set of 0s and 1s in the current interval. This property of the encoding technique allows the outputs from a given set of sense amplifiers to make comparisons of disparate symbols on nodes that were at the same voltage level during the prior time interval. In FIG. 2, the row SAyy identifies which sense amplifiers in receiver 112 (FIG. 1) have both input terminals at the same logic level in the identified time interval. For example, at time T1 sense amplifiers SAad and SAbc have like-valued inputs, and consequently an indeterminate output value 'x'.

Figure 3:
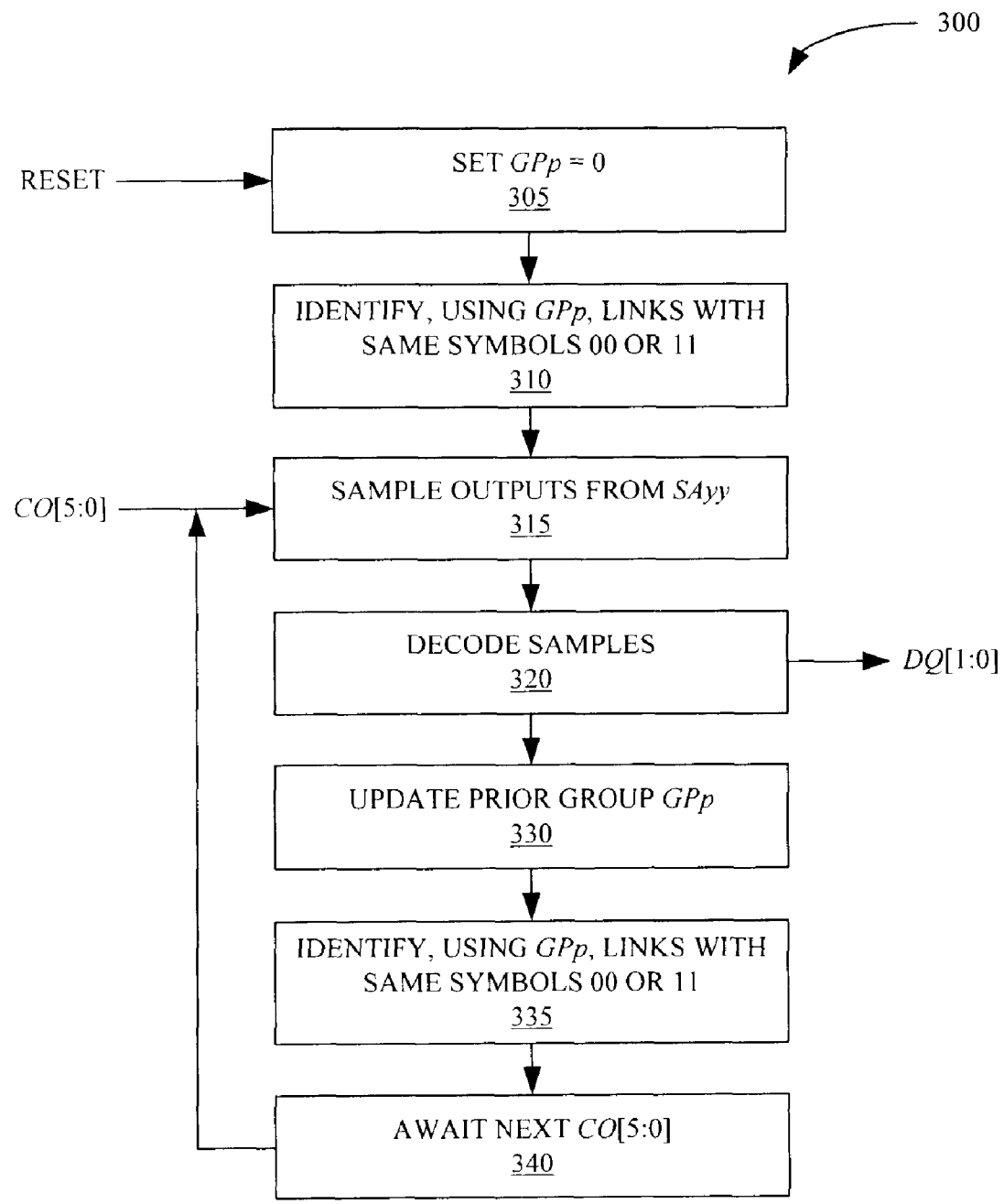
FIG. 3 is a flowchart depicting the operation of decoder and group detector of FIG. 1 in accordance with the decoding technique of Table 1.

FIG. 3 presents a flowchart 300 depicting the operation of decoder 128 (FIG. 1) and group detector 134 (FIG. 1) in accordance with the decoding technique of Table 1. Before decoder 128 (FIG. 1) begins decoding codewords, encoder 118 (FIG. 1) asserts one codeword from group zero on channel 114 (FIG. 1) to preset the links to a known state. For example, this can be done prior to sending a packet of data, and can be initiated by optional control logic 122 (FIG. 1). Beginning the decoding sequence at operation 305, reset signal RESET is asserted to set the prior group number GPp to zero, which synchronizes the group number with the link state. The reset signal can be asserted by the optional control logic 132 (FIG. 1).

Then, at operation 310, decoder 128 (FIG. 1) uses the prior group number GPp to identify which of links a, b, c, and d of channel 114 (FIG. 1) received a pair of like symbols in the prior time interval. For example, with reference to time intervals T0, T2, T7, and T9 of FIG. 2 codes in group number 0 provide like-valued inputs on node pairs a/b and c/d. Sense amplifiers SAyy, the ones with like inputs and indeterminate outputs, are therefore SAab and SAcd for group-zero codewords.

Decoder 128 (FIG. 1) receives the outputs from comparison circuit 126 (FIG. 1) as a series of six-symbol sets CO[5:0] (FIG. 1). Decoder 128 (FIG. 1) samples the outputs from sense amplifiers SAyy for each codeword (operation 315) and decodes them to produce the encoded data DQ[1:0] 130 (FIG. 1). For example, with reference to time interval T1 of FIG. 2, the prior group number is 0 (Grp#=0), so sense amplifiers SAyy for the prior group are SAab and SAcd. The outputs from sense amplifiers SAab and SAcd, respectively CO[5] and CO[0], are 0 and 1 in interval T1. Table 1 illustrates that a transition from group zero to codeword two happens when data DQ[1:0] 116 (FIG. 1) is 00, so decoder 128 (FIG. 1) interprets the 01 outputs from sense amplifiers SAab and SAcd to mean that data DQ[1:0] 130 (FIG. 1) is to equal 00 at operation 320.

Decoder 128 (FIG. 1) knows the current codeword from the decoding of operation 320, and uses this to update the value of the prior group number GPp (operation 330). Then, decoder 128 (FIG. 1) uses the updated prior group number GPp to identify which of links a, b, c, and d had like symbols in the prior codeword (operation 335) and awaits the next set of symbols CO[5:0] from the sense amplifiers (operation 340). The flow of operations 315 through 340 repeats for each successive codeword.

A property of the encoding/receiving technique illustrated using the embodiment of Table 1 is that eye diagrams from samplers SAyy that received two like-symbols in the prior time interval are wider than those associated with differential links. This is because the outputs from samplers SAyy transition from intermediate level Vint to ±Vp, whereas the output from samplers in differential links typically have a larger transition between voltages −Vp and +Vp.

Figure 4A:
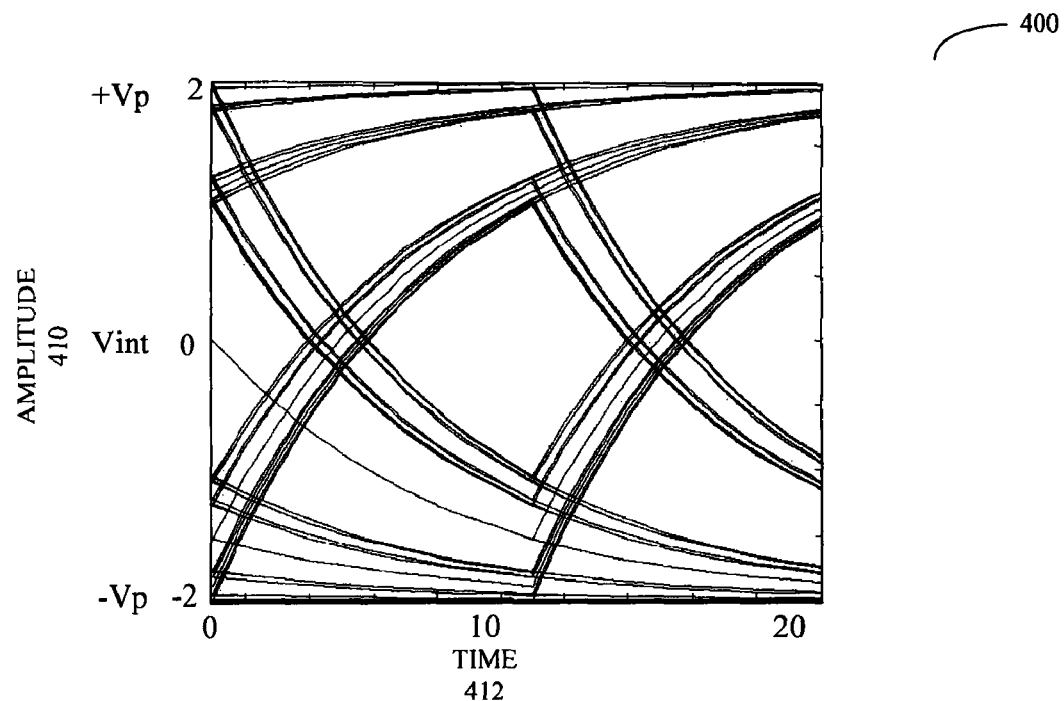
FIG. 4A presents a graph illustrating an eye pattern, plotted as amplitude versus time, for differential signaling on an RC channel.
Figure 4B:
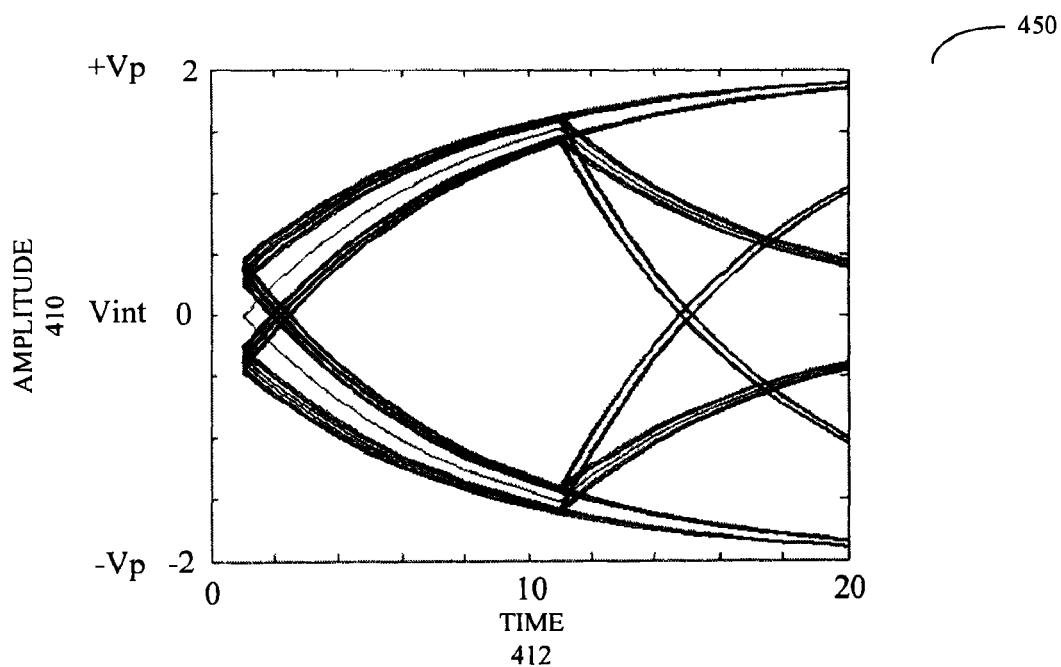
FIG. 4B presents a graph illustrating an eye pattern for the 2-4 encoding/receiving technique detailed in connection with FIGS. 1-3 on a similar RC channel.

FIG. 4A presents a graph 400 illustrating an eye pattern, plotted as amplitude 410 versus time 412, for differential signaling on an RC channel. FIG. 4B presents a similar graph 450 illustrating an eye pattern for the 2-4 encoding/receiving technique detailed in connection with FIGS. 1-3 on a similar RC channel. The eye pattern in graph 450 has dramatically larger timing and voltage margins than the eye pattern in graph 400. The area of the eye pattern is over 50% larger than that of graph 400, which allows the data rate to be increased by up to 1.5× with comparable performance (such as the same bit-error rate) at the receiver. This results in a 50% increase in throughput, which translates into 50% more bandwidth per wire.

Errors can propagate due to the reliance of decoder 128 (FIG. 1) on correct resolution of the prior codeword. A variety of techniques may be helpful in limiting error propagation, including: communicating data 116 (FIG. 1) in a data packet of bounded size; periodic or as-needed transmission of a predetermined sequence of symbol sets; and/or the use of error detection and/or error correction codes. The predetermined sequence of symbol sets may include: a known pattern or a low data-rate pattern. In some embodiments, group detector 134 (FIG. 1) detects or corrects errors in the determination of the preceding group. For example, errors may be detected and/or corrected based on inputs to and/or outputs from the sense amplifiers (FIG. 1). In some embodiments, optional control logic 122 and 132 (FIG. 1) can initiate remedial action and/or adjustments using, e.g., an auto-negotiation technique. During this auto-negotiation technique, a receive circuit in one of the components (e.g., receiver 112 in FIG. 1) may provide feedback to a transmit circuit in another component (such as on transmitter 110 in FIG. 1) on the efficacy of any changes to the signals on a given sub-channel or on the state of the channel (e.g., channel 14 in FIG. 1). Based on this feedback, the transmit circuit may further modify these signals, e.g., may perform the remedial action.

Figure 5:
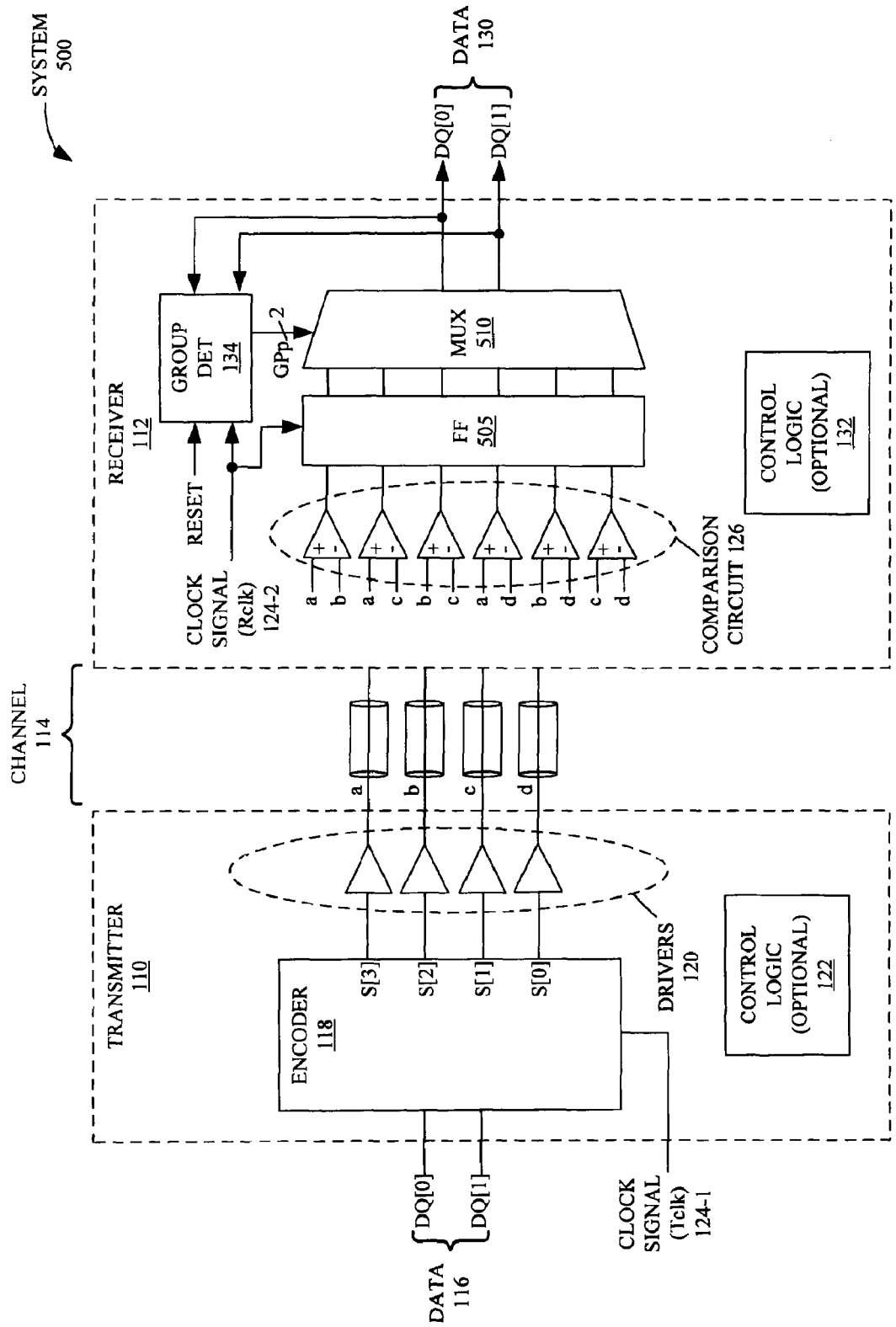
FIG. 5 depicts a system in accordance with another embodiment.

FIG. 5 depicts a system 500 in accordance with another embodiment. System 500 is similar to system 100 of FIG. 1, with like-identified elements being the same or similar. The function of decoder 128 of FIG. 1 is accomplished using a combination of a flip-flip 505 and a multiplexer 510. Flip-flop 505 samples the outputs of comparison circuit 126 and multiplexer 510 selects a pair of sense amplifiers SAyy (FIG. 2) for each time interval based upon the prior code group GPp identified by group detector 134.

Figure 6:
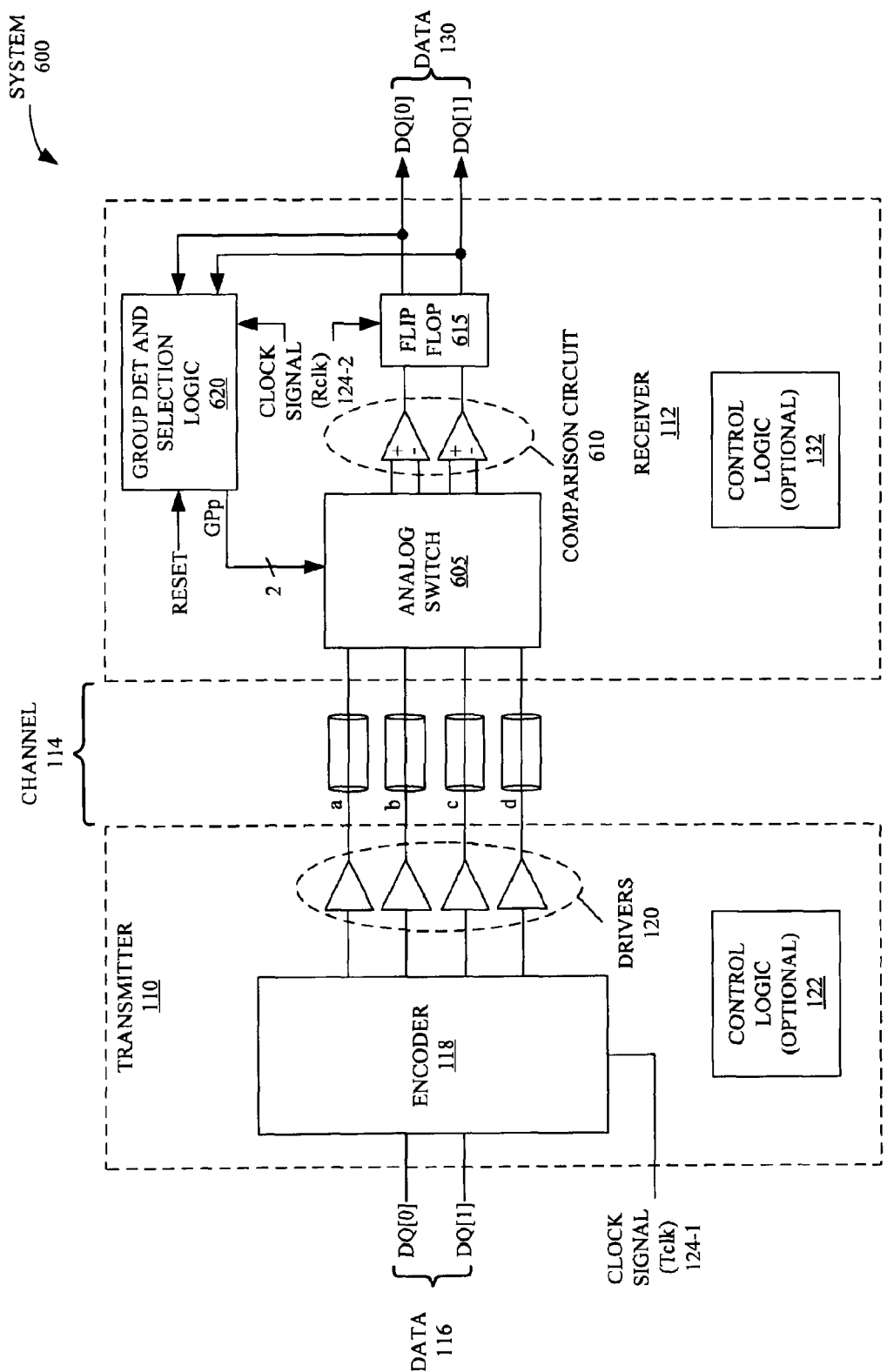
FIG. 6 depicts a system in accordance with another embodiment.

FIG. 6 depicts a system 600 in accordance with another embodiment. System 600 is similar to system 100 of FIG. 1, with like-identified elements being the same or similar. The functions of decoder 128 and group detector 134 of FIG. 1 are accomplished using a combination of an analog switch 605, a comparison circuit 610 with two sense amplifiers, a flip-flop 615, and group detection and selection logic 620. Group detection and selection logic 620 tracks the prior group number GPp, as in prior embodiments, and directs switch 605 to connect two pairs to nodes to the inputs of the two sense amplifiers in comparison circuit 610. Then, flip flop 615 captures the outputs from the sense amplifiers. The node selection of group detection and selection logic 620 couples the pair of nodes expressing two 0s in the prior time interval to one sense amplifier and the pair of nodes expressing two 1s in the prior time interval to the other sense amplifier. Therefore, the two sense amplifiers act as sense amplifiers SAyy of prior examples.

The foregoing embodiments employ the outputs from two sense amplifiers to decode data. Other embodiments decode data by considering additional sense-amplifier outputs. For example, the decoder can sample all available sense-amplifier outputs over a number of time intervals and apply the resulting samples to a trellis to determine the most probable data sequence. Viterbi decoding is one well-known algorithm for finding a most probable trellis-encoded data sequence.

Table 2 provides a coding table for use in another embodiment. In this example, up to nine input values are mapped to up to twenty codewords (in ten groups of codewords) on six links or wires. Table 2 also provides the codewords used to encode nine possible values (0-8) of input data and the sense amplifiers employed in sensing the subsequent codeword. The following example uses the codespace of Table 2 to map eight possible values 000 to 111 of three-bit data DQ[2:0] into six-bit codewords for transmission across a six-link channel. This represents the same pin efficiency as differential signaling, which uses six conductors (three conductor pairs) to convey three-bit symbols in parallel. The encoding and decoding technique improves timing and voltage margins, however, and consequently affords improved speed performance and/or noise tolerance than similar differential systems.

TABLE 2

| Group | Codeword | M symbols for links a b c d e f | Next Codeword Corresponding to a Input Data Value of: 0, 1, 2, 3, 4, 5, 6, 7, 8 | Selected Sense Amplifier Outputs for the Next Codeword |
|---|---|---|---|---|
| 0 | 0  | 0 0 0 1 1 1 | 2, 4, 6, 8, 10, 12, 14, 16, 18 | a-b, b-c, a-c, d-e, e-f, d-f |
|   | 1  | 1 1 1 0 0 0 | 2, 4, 6, 8, 10, 12, 14, 16, 18 | a-b, b-c, a-c, d-e, e-f, d-f |
| 1 | 2  | 1 0 0 0 1 1 | 8, 19, 17, 14, 13, 11, 0, 4, 6 | b-c, c-d, b-d, a-e, e-f, a-f |
|   | 3  | 0 1 1 1 0 0 | 8, 19, 17, 14, 13, 11, 0, 4, 6 | b-c, c-d, b-d, a-e, e-f, a-f |
| 2 | 4  | 1 0 0 1 0 1 | 10, 19, 15, 16, 13, 9, 0, 2, 6 | b-c, c-e, b-e, a-d, d-f, a-f |
|   | 5  | 0 1 1 0 1 0 | 10, 19, 15, 16, 13, 9, 0, 2, 6 | b-c, c-e, b-e, a-d, d-f, a-f |
| 3 | 6  | 1 0 0 1 1 0 | 12, 17, 15, 16, 11, 9, 0, 2, 4 | b-c, c-f, b-f, a-d, d-e, a-e |
|   | 7  | 0 1 1 0 1 0 | 12, 17, 15, 16, 11, 9, 0, 2, 4 | b-c, c-f, b-f, a-d, d-e, a-e |
| 4 | 8  | 0 1 0 0 1 1 | 2, 19, 17, 14, 7, 5, 0, 10, 12 | a-c, c-d, a-d, b-e, e-f, b-f |
|   | 9  | 1 0 1 1 0 0 | 2, 19, 17, 14, 7, 5, 0, 10, 12 | a-c, c-d, a-d, b-e, e-f, b-f |
| 5 | 10 | 0 1 0 1 0 1 | 4, 19, 15, 16, 7, 3, 0, 8, 12 | a-c, c-e, a-e, b-d, d-f, b-f |
|   | 11 | 1 0 1 0 1 0 | 4, 19, 15, 16, 7, 3, 0, 8, 12 | a-c, c-e, a-e, b-d, d-f, b-f |
| 6 | 12 | 0 1 0 1 1 0 | 6, 17, 15, 16, 5, 3, 0, 8, 10 | a-c, c-f, a-f, b-d, d-e, b-e |
|   | 13 | 1 0 1 0 0 1 | 6, 17, 15, 16, 5, 3, 0, 8, 10 | a-c, c-f, a-f, b-d, d-e, b-e |
| 7 | 14 | 0 0 1 0 1 1 | 2, 13, 11, 8, 7, 5, 0, 16, 18 | a-b, b-d, a-d, c-e, e-f, c-f |
|   | 15 | 1 1 0 1 0 0 | 2, 13, 11, 8, 7, 5, 0, 16, 18 | a-b, b-d, a-d, c-e, e-f, c-f |
| 8 | 16 | 0 0 1 1 0 1 | 4, 13, 9, 10, 7, 3, 0, 14, 18 | a-b, b-e, a-e, c-d, d-f, c-f |
|   | 17 | 1 1 0 0 1 0 | 4, 13, 9, 10, 7, 3, 0, 14, 18 | a-b, b-e, a-e, c-d, d-f, c-f |
| 9 | 18 | 0 0 1 1 1 0 | 6, 11, 9, 10, 5, 3, 0, 14, 16 | a-b, b-f, a-f, c-d, d-e, c-e |
|   | 19 | 1 1 0 0 0 1 | 6, 11, 9, 10, 5, 3, 0, 14, 16 | a-b, b-f, a-f, c-d, d-e, c-e |

FIG. 7 is a waveform diagram 700 illustrating a sequence of three-symbol data patterns DQ[2:0] and the corresponding six-symbol codewords S[5:0] for an embodiment that employs the codespace of Table 2 to encode three-bit data (i.e., up to eight possible input patterns 000 through 111, or zero to seven decimal).

Beginning at time T0, the current codeword is codeword zero of group zero (Grp#=0), which is expressed as symbols S[5:0]=000111. The bit positions of symbols S[5:0] correspond to respective links a, b, c, d, e, and f (e.g., S[5] is the logic value expressed on link a). The encoding technique encodes each successive codeword based upon the temporally adjacent and immediately preceding codeword. In the series of time intervals T0-T10 of FIG. 7, each codeword in a current time interval is used to encode subsequent data DQ[2:0] to form the subsequent codeword in the next time interval. For example, assuming interval T1 is the current time interval, codeword zero, or 000111, is used to encode data DQ[2:0]=000 into codeword 100011 during time interval T1. The encoding is repeated for each pair of temporally adjacent ones of the four-symbol codewords.

The encoding technique divides the symbols of the current time interval T1 into two sets of symbols, a first set 705 representing logic 0s and a second set 710 representing logic 1s. In this embodiment, the encoding technique encodes the subsequent codeword at time interval T1 such that only one symbol on each of the first and second sets of nodes 705 and 710 transitions. In this technique, data pattern DQ[2:0]=000 at time interval T1 is encoded into the codeword at time interval T1 such that the codeword at time T1 is expressed as a third symbol set 715 (S[5:3]=100) on the first set of nodes {a, b, c} and a fourth symbol set 720 (S[2:0]=011) on the second set of nodes {d, e, f} defined by the codeword from time interval T0. The encoding of data DQ[2:0] at time interval T1 selects the third set of symbols 715 from a first group of symbol sets in which each set has a fixed, positive number of logic 0 symbols and the fourth set of symbols 720 from a second group of symbols in which each symbol has a fixed, positive number of logic 1 symbols.

The transition from interval T0 to T1 is from codeword zero to codeword 2 (000111 to 100011), which involves one zero-to-one transition and one one-to-zero transition. With reference to Table 2, all of the codewords that can follow codeword zero involve one zero-to-one transition and one one-to-zero transition. Transitions from codeword zero thus lead to codewords in which the nodes used to express 0s in the last codeword now express mixed symbol types, including exactly one logic 1 and two logic 0s, and the nodes used to express 1s in the last codeword now express mixed symbol types, including exactly one logic 0 and two logic 1s.

In creating the subsequent codeword at time interval T2 (i.e., the current time interval is T1), the first set of nodes 725 becomes those associated with links b, c, and d (all 0s) and the second set of nodes 730 with links a, e, and f (all 1s). The subsequent codeword at time interval T3 is encoded such that one symbol transitions in each of the first and second symbol sets 725 and 730. More generally, each subsequent codeword is encoded in a manner that ensures that the collection of nodes exhibiting a set of 1s and the collection of nodes exhibiting a set of 0s in the prior time interval each include a mixed set of 0s and is in the current interval. This property of the encoding technique allows a decoder to rely upon comparisons of disparate symbols on nodes that were at the same voltage level during the prior time interval.

Subsequent codewords are selected from groups that exhibit fixed numbers of symbols of the first and second types, which leads to a determinate number of transitions between adjacent codewords. However, the fixed numbers of symbols of the first and second types can be different for different codeword transitions. The transition from codeword zero produces two transitions, for example, one on the set of nodes that expressed logic 0s in the prior interval and one on the set of nodes that expressed logic 1s in the prior interval. Other subsequent codewords can involve different numbers of transitions. With reference to Table 2, codeword 15 can transition to any of codewords 2, 13, 11, 8, 7, 5, 0, 15, and 18. In each case the subsequent codeword requires four transitions, two on the nodes that expressed logic 0s in the prior interval and two on the nodes that expressed logic 1s in the prior interval.

FIG. 7 depicts a transition from codeword 15 to codeword 13, and provides an example of a subsequent codeword that is expressed using four transitions, two zero-to-one transitions and two one-to-zero transitions. With reference to Table 2, all of the codewords that immediately follow codeword 15 include the same fixed numbers of 0 and 1 transitions.

In the foregoing description and in the accompanying drawings, specific terminology and drawing symbols are set forth to provide a thorough understanding of the present invention. In some instances, the terminology and symbols may imply specific details that are not required to practice the invention. For example, embodiments of the invention may be adapted for use with multi-pulse-amplitude-encoded (multi-PAM) signals.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the present invention has been described in connection with specific embodiments, the claims are not limited to what is shown. For example, the foregoing embodiments depict two-to-four and three-to-six encoding techniques. More generally, embodiments can support N-to-M encoding, where M is greater than N and is at least four. The N-symbol data can be represented using all or a subset of possible N-symbol values. Furthermore, the embodiments detailed above can be replicated and/or combined to support different input data widths (e.g., four two-to-four encoders can be logically combined to convey eight-bit data over sixteen links). Moreover, some components are shown directly connected to one another while others are shown connected via intermediate components. In each instance the method of interconnection, or 'coupling,' establishes some desired electrical communication between two or more circuit nodes or terminals. Such coupling may often be accomplished using a number of circuit configurations, as will be understood by those of skill in the art. For example, the foregoing codespaces provide balanced signaling, and support AC-coupled links. Other embodiments can be unbalanced, include DC-coupled links, or both. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:

1. A method performed by an integrated circuit having signal nodes, the method comprising:
   receiving N-symbol data patterns; and
   encoding the N-symbol data patterns into a sequence of M-symbol codewords, where M is larger than N, such that:
   a respective M-symbol codeword in the sequence of M-symbol codewords is expressed as a first set of symbols on respective ones of a first subset of the signal nodes and a second set of symbols on respective ones of a second subset of the signal nodes, the first set of symbols having X symbols of the first type and Y symbols of the second type, and the second set of symbols having Y symbols of the first type and X symbols of the second type, wherein X and Y are fixed, positive numbers, and wherein a codeword immediate preceding the respective M-symbol codeword has been expressed as a third set of symbols all of a first symbol type on respective ones of the first subset of the signal nodes and a fourth set of symbols all of a second symbol type on respective ones of the second subset of the signal nodes.

2. The method of claim 1, wherein the first type is representative of a logic zero and the second type is representative of a logic one.

3. The method of claim 1, wherein the number of signal nodes in the first subset of the plurality of signal nodes equals the number of signal nodes in the second subset of the plurality of signal nodes.

4. The method of claim 1, wherein N is two, M is four, X is one and Y is one.

5. A method performed by an integrated circuit having signal nodes, the method comprising:
   receiving 2-symbol data patterns;
   encoding the 2-symbol data patterns into a series of 4-symbol codewords, the 4-symbol codewords being selected from a set of codewords each having two symbols of a first type and two symbols of a second type, the set of code words being organized into groups of codewords such that codewords in each group are complimentary to each other, every two consecutive codewords among the series of 4-symbol codewords being selected from different groups of codewords; and
   transmitting symbols of each of the series of 4-symbol codewords via respective ones of the signal nodes.

6. The method of claim 5, wherein the first type is representative of a logic zero and the second type is representative of a logic one.

7. An integrated circuit comprising:
   an encoder having multiple encoder output terminals, the encoder to encode data comprising N-bit datawords into a sequence of M-symbol codewords such that, a respective M-symbol codeword in the sequence of M-symbol codewords is expressed as a first set of symbols on respective ones of a first set of the encoder output terminals and a second set of symbols on respective ones of a second set of the encoder output terminals, the first set of symbols having X symbols of the first type and Y symbols of the second type, and the second set of symbols having Y symbols of the first type and X symbols of the second type, wherein X and Y are fixed, positive numbers, and wherein a codeword immediate preceding the respective M-symbol codeword has been expressed as a third set of symbols all of a first symbol type on respective ones of the first set of the encoder output terminals and a fourth set of symbols all of a second symbol type on respective ones of the second set of the encoder output terminals.

8. The integrated circuit of claim 7, wherein X is equal to Y.

9. The integrated circuit of claim 7, wherein N is two, M is four, X is one and Y is one.

10. The integrated circuit of claim 7, wherein the first symbol type is representative of a logic zero and the second symbol type representative of a logic one.

11. An integrated circuit comprising:
    input nodes to receive a series of symbols sets in respective ones of a series of time intervals, the input nodes receiving in parallel respective symbols in each of the symbol sets, the series of symbol sets including a current symbol set in a current time interval and a prior symbol set in a prior time interval, wherein each symbol in the symbol sets represents one of multiple symbol values; and a decoder to generate decoded data bits corresponding to the current symbol set based on decoded data bits corresponding to the prior symbol set and on comparison results from comparing symbols received by selected pairs of the input nodes, each of the selected pairs of input nodes having received symbols of a same symbol value during the prior time interval.

12. The integrated circuit of claim 11, wherein the input nodes include at least four input nodes and the integrated circuit further comprises comparison circuits to provide comparison results for each pair of the input nodes and at least one multiplexor to select the comparison results from outputs of the comparison circuits.

13. The integrated circuit of claim 11, wherein the multiple symbol values include a first symbol value representative of a logic zero and a second symbol value representative of a logic one.

14. The integrated circuit of claim 11, wherein the decoder includes a selection circuit to select the selected pairs of input nodes, the selection circuit include at least one of an analog switch and a multiplexor.

15. The integrated circuit of claim 11, wherein the series of symbol sets belong to a codespace including groups of complementary codewords, wherein the previous and current symbol sets correspond to different groups of complementary codewords.

16. The integrated circuit of claim 15, further comprising a group detector to detect a group to which each of the codewords corresponds.

17. A method of decoding a sequence of codewords, each codeword including symbols of a first symbol type and symbols of a second symbol type, the method comprising:
receiving respective symbols of a first codeword at respective input nodes during a first time interval;
receiving respective symbols of a second codeword at respective ones of the input nodes during a second time interval following the first time interval;
comparing at least one pair of symbols received at a first set of nodes to produce a first comparison result and comparing at least one pair of symbols received at a second set of nodes to produce a second comparison result, each of the first set of the input nodes having received a symbol of the first symbol type during the first time interval and each of the second set of the input nodes having received a symbol of the second symbol type during the first time interval; and
decoding the second codeword based on the first and second comparison results.

18. The method of claim 17, further comprising selectively connecting the first set of the nodes to a first comparator producing the first comparison result and selectively connecting the second set of the nodes to a second comparator producing the second comparison results.

19. The method of claim 17, further comprising comparing symbols received at one of the first set of the nodes and at one of the second set of the nodes to produce a third comparison results, and disregarding the third comparison results in decoding the second codeword.

20. An integrated circuit comprising:
input nodes to receive a series of symbol sets in respective ones of a series of time intervals, the input nodes receiving in parallel respective symbols in each of the symbol sets, the series of symbol sets including a current symbol set in a current time interval and a prior symbol set in a prior time interval, wherein each symbol in the symbol sets represents one of multiple symbol values; and
means for identifying at least one subset of the input nodes that has received symbols of a same symbol value in the prior time interval, and for decoding the current symbol set based on comparison results from comparing symbols received at the at least one of the input nodes.

21. A system comprising:
a first integrated circuit that includes an encoder having multiple encoder output terminals, the encoder to encode data comprising N-bit datawords into a sequence of M-symbol codewords such that, a respective M-symbol codeword in the sequence of M-symbol codewords is expressed as a first set of symbols on respective ones of a first set of the encoder output terminals and a second set of symbols on respective ones of a second set of the encoder output terminals, the first set of symbols having X symbols of the first type and Y symbols of the second type, and the second set of symbols having Y symbols of the first type and X symbols of the second type, wherein X and Y are fixed, positive numbers, and wherein a codeword immediate preceding the respective M-symbol codeword has been expressed as a third set of symbols all of a first symbol type on respective ones of the first set of the encoder output terminals and a fourth set of symbols all of a second symbol type on respective ones of the second set of the encoder output terminals; and
a second integrated circuit having:
input nodes to receive a series of symbol sets in respective ones of a series of time intervals, the input nodes receiving in parallel respective symbols in each of the symbol sets, the series of symbol sets including a current symbol set in a current time interval and a prior symbol set in a prior time interval, wherein each symbol in the symbol sets represents one of multiple symbol values; and
a decoder to generate decoded data bits corresponding to the current symbol set based on decoded data bits corresponding to the prior symbol set and on comparison results from comparing symbols received by selected pairs of the input nodes, each of the selected pairs of input nodes having received symbols of a same symbol value during the prior time interval.

* * * * *